No. 741,629. PATENTED OCT. 20, 1903.
J. COWAN.
WATER TUBE BOILER SETTING OR CASING.
APPLICATION FILED SEPT. 18, 1902.
NO MODEL. 5 SHEETS—SHEET 4.
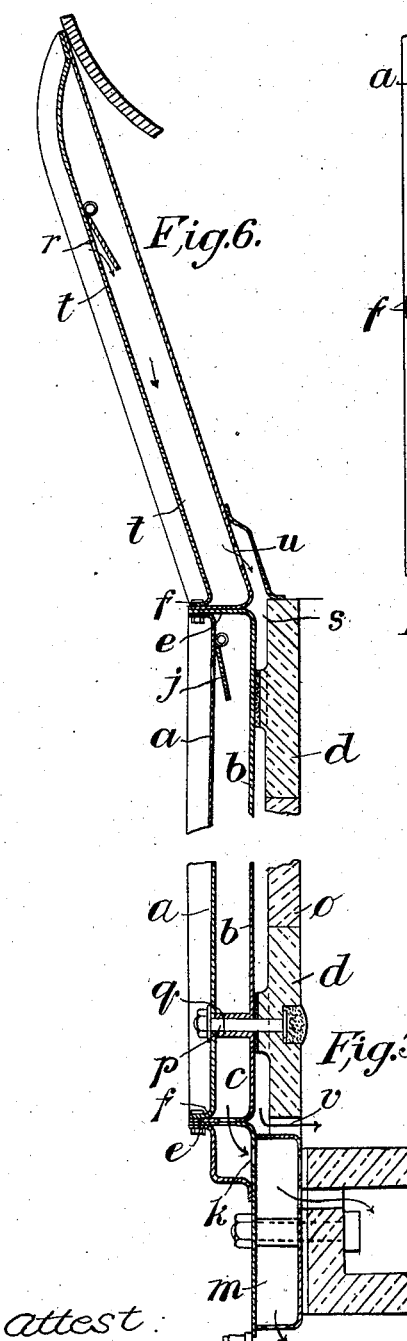
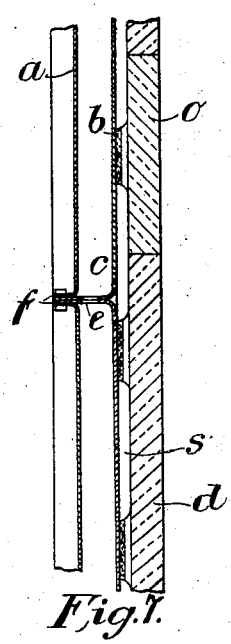
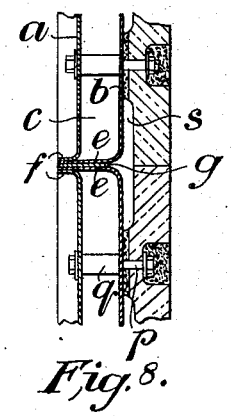
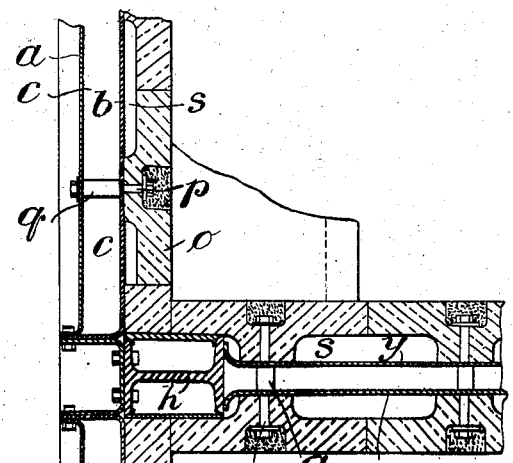

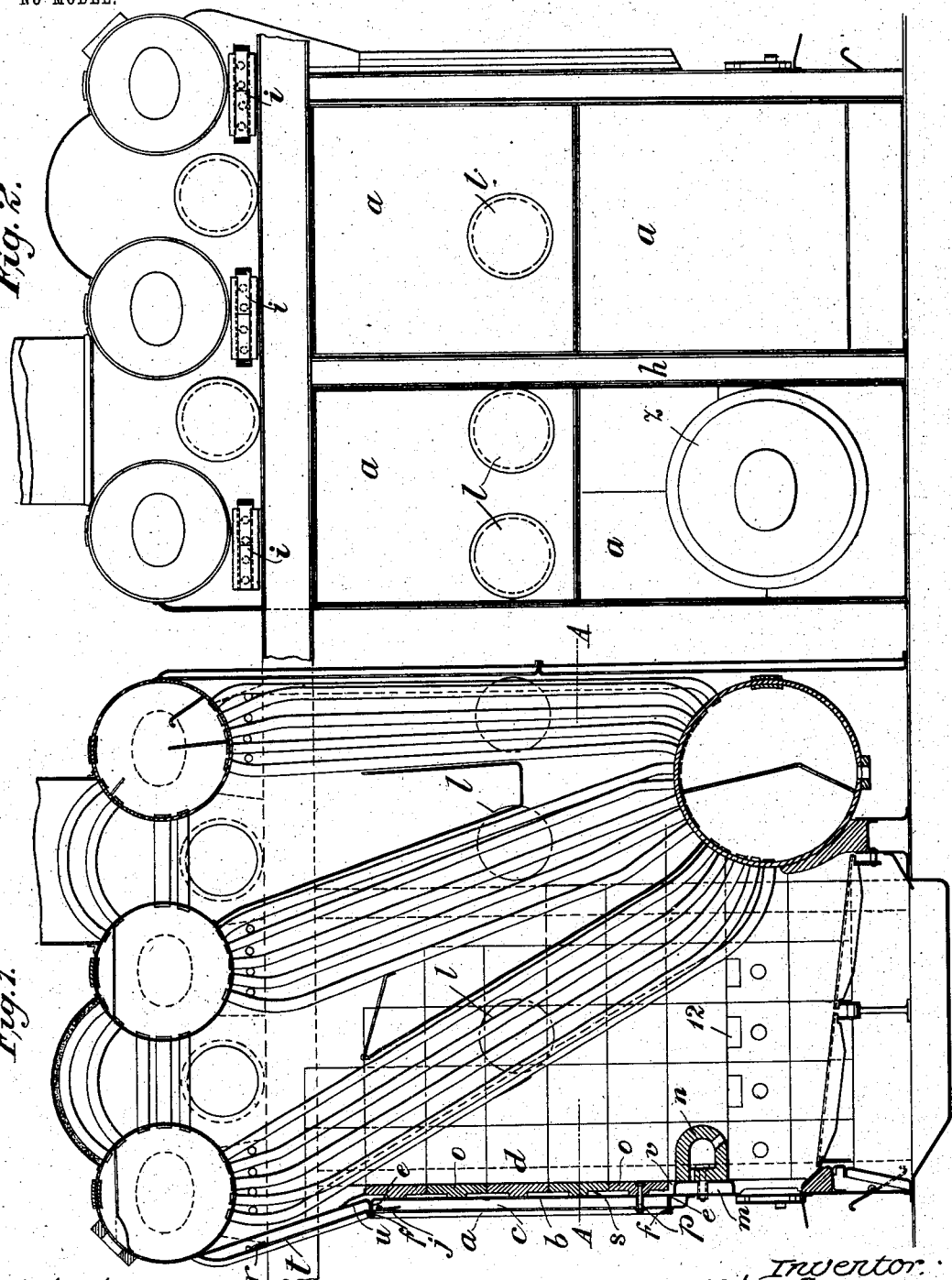

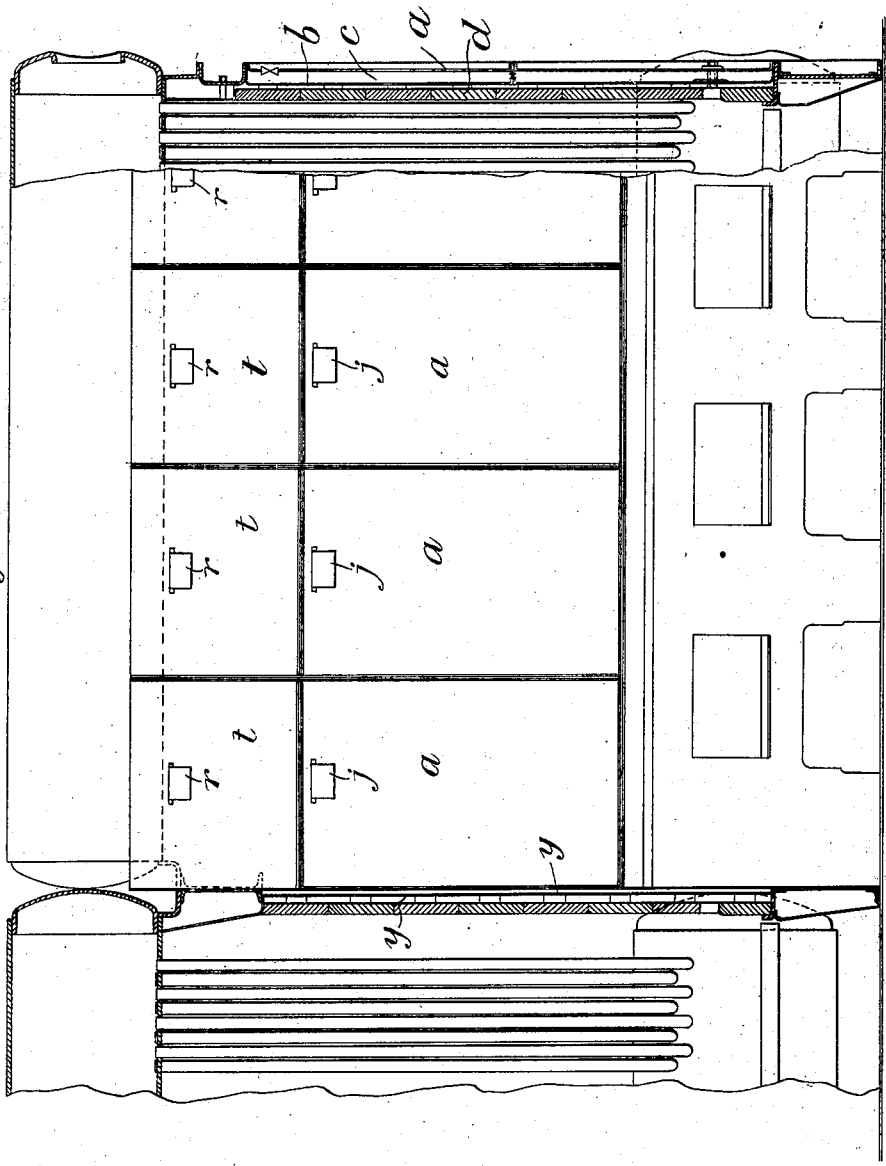

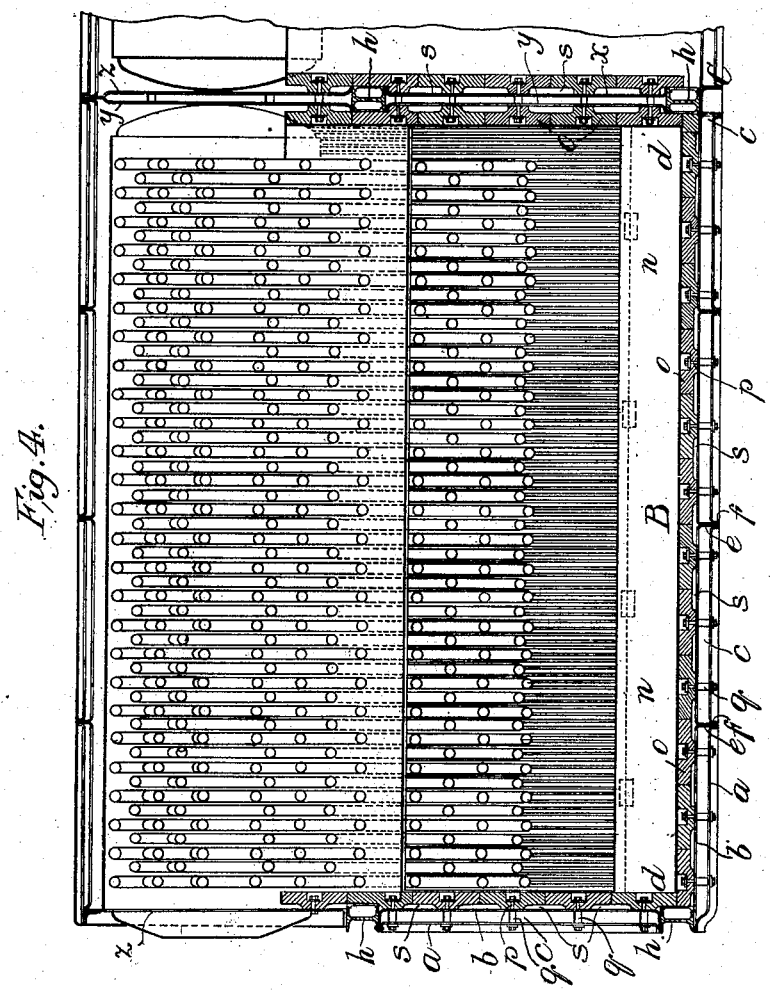

No. 741,629. PATENTED OCT. 20, 1903.
J. COWAN.
WATER TUBE BOILER SETTING OR CASING.
APPLICATION FILED SEPT. 18, 1902.
NO MODEL. 5 SHEETS—SHEET 5.
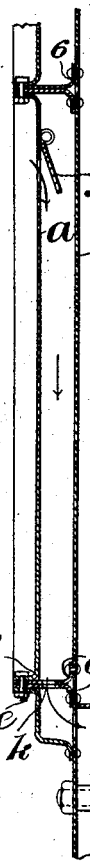
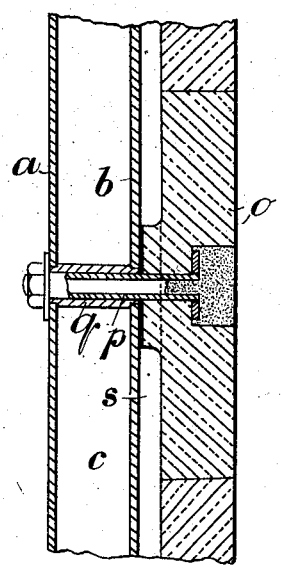
Fig. 10.
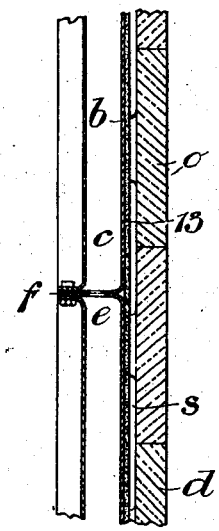
Fig. 11.
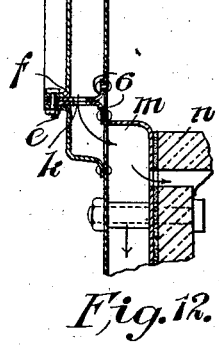
Fig. 12.
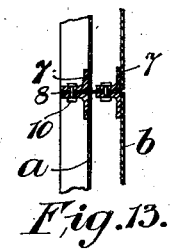
Fig. 13.
Attest:
C. Middleton
Edward Sarton
Inventor:
John Cowan
by Ellis Spear
Atty.

No. 741,629.  
Patented October 20, 1903.

UNITED STATES PATENT OFFICE.

JOHN COWAN, OF EDINBURGH, SCOTLAND.

WATER-TUBE-BOILER SETTING OR CASING.

SPECIFICATION forming part of Letters Patent No. 741,629, dated October 20, 1903.

Application filed September 18, 1902. Serial No. 123,927. (No model.)

*To all whom it may concern:*

Be it known that I, JOHN COWAN, a subject of the King of Great Britain and Ireland, and a resident of 2 St. Andrew's Square, Edinburgh, Scotland, have invented certain new and useful Improvements Relating to Water-Tube Boilers, (for which I have made application for patent in Great Britain, No. 5,202, dated March 1, 1902,) of which the following is a specification.

My invention relates to water-tube-boiler settings or casings.

When water-tube boilers are employed for marine purposes, they are generally set in sheet-metal casings instead of in such brickwork as is usually employed for land purposes. Many such boiler-casings have hitherto been constructed with a double shell filled with silicate cotton or other non-conducting material.

My invention has for its object to improve the construction of such casings, so that they may be readily taken to pieces, and to utilize them for the purpose of heating a portion of the air-supply to the furnace in order to secure more efficient combustion of the fuel.

My invention consists in constructing a water-tube-boiler casing with a double shell formed of removable panels, each of which consists of two plates, between which air may be circulated in order to keep the casing cool and then employed for combustion by admission to the boiler-furnace at suitable positions.

My invention further consists in circulating air for cooling purposes between the firebrick lining and the double-shell casing and employing the air heated in this manner for assisting combustion in the boiler-furnace. It is obvious that the air may be caused to pass through the casing only or first through the casing and then between the inner casing-plates and inside face of the fire-brick lining before passing to the furnace.

My invention also consists in special details of the construction of the double-shell casings and linings.

Referring now to the accompanying drawings, Figure 1 is a sectional side elevation of a single-ended marine "Stirling" boiler with my invention applied. Fig. 2 is a side elevation of a similar boiler of the opposite hand and adapted to be placed with its back against the back of the above boiler. Fig. 3 is a front elevation of the boiler seen in Fig. 1 with a portion of a similar boiler set in battery with it on the left-hand side. The extreme right of this figure is drawn in section to show the air-circulating passages and fire-resisting bricks or tiles. Fig. 4 is a sectional plan on the line A A of Fig. 1. Figs. 5 and 6 are enlarged sectional elevations of the lower and upper portions, respectively, of the front casing seen in Fig. 1. Fig. 7 is a similar view of a portion of the casing seen in section at the right-hand side of Fig. 3. Figs. 8 and 9 are enlarged sectional views of the middle portion B and corner C of Fig. 4. Fig. 10 is a sectional view of a casing-bolt, drawn to an enlarged scale. Fig. 11 is an enlarged sectional view of a modified form of lining in which the inner air-passage is situated between a lining of asbestos millboard held against the inner plating and the fire-brick wall. Fig. 12 is a cross-sectional view of a modified form of double panel, and Fig. 13 is a cross-sectional view of a portion of another modified form of double panel.

In carrying out my invention as applied to marine boilers of the now well-known Stirling type I inclose the boiler by a double casing of metal plates. The inner and outer casings $a$ and $b$ are separated from each other, so as to leave an air-space $c$ between them, and a fire-resisting tile lining $d$ is secured to the furnace side of the inner casing $b$ to prevent it from becoming overheated.

According to one modification of my invention the casings consist of a number of rectangular metal plates flanged all around. The outer plates of the casing are telescoped or inserted in the inner dished plate, so that the edges of the flanges of both plates are flush with each other. As shown in Figs. 5, 6, and 7, the flanges $e$ of the plates $b$ are considerably deeper than the flanges $f$ of the plates $a$, and the difference between the depths of these flanges determines the width of the air-space $c$. The casing is thus formed in panels, each panel consisting of two dished plates, one inserted in the other. The panels are secured by bolts passing through their adjacent outside flanges. A stiffening-plate $g$ (see Fig. 8) may be employed between the flanges of the adjacent panels, and in this case the connecting-bolts pass through the flanges and stiffening-plates. The casings may be strengthened by securing them to the columns $h$, which support the boiler.

In order that a positive circulation of air through the casing shall take place and that the air heated by its contact with the warm inner wall of the casing shall be utilized for promoting combustion in the boiler, I provide the casing with suitable openings to the atmosphere and to the furnace or combustion-chamber of the boiler. Communication between sections of the casing-panels is effected by suitable holes in adjacent upper and lower flanges.

In Figs. 1, 2, 5, and 6 hinged or sliding doors $j$ admit air, which passes between the walls $a$ and $b$ through holes $k$ in the flanges into chamber $m$, which communicates with an air-distributer $n$, of refractory material. The air-distributer is provided with a number of openings, which direct the hot air toward and between the tubes forming the front tube-bank of the boiler near the bottom. Hot air may also be conducted to a closed ash-pit or it may be admitted behind the fire-bridge or to any other desired position.

I may provide either for all the casings to be connected up in one air-circulation system or I may provide a separate air circulation in the casings forming the front and sides of the boiler, as may be most desirable in any particular case. This will be readily understood without special reference to drawings.

As the casing is formed of a number of panels which may be readily detached from one another, it will be seen that the whole casing may be transported in small pieces and very easily erected around the boiler.

An additional air-circulation system may be produced by forming the fire-brick wall $d$ with grooves or checks, forming passages in communication with the atmosphere either directly or through the main air-jacket $c$ and with the furnace or combustion-chamber of the boiler, as seen in Fig. 1.

According to the modification shown in the above-mentioned figure the fire-brick lining consists of a number of fire tile blocks having checks or grooves $s$ formed on the sides adjacent to the casing-wall $b$. The tiles $o$ are held in position by bolts $p$, which pass through the casing-walls $a$ and $b$. (See Fig. 10.) The bolts are preferably constructed of tubes, with washer ends screwed on and expanded to provide heads with large bearing-surfaces to prevent nipping the bricks. The hollow heads are filled with fire-clay or ganister or other suitable material to protect them from the heat of the furnace-gases. Ferrules $q$ on the bolts $p$ keep the walls $a$ and $b$ at the desired distance apart and stiffen the structure of the casings.

The upper panels $t$ of the casing are provided with air-inlets $r$. They do not, however, communicate with the main portion of the hollow casing, but only with the lining-passages $s$ by means of openings $u$, formed in the lower portion of the panels $t$, as shown in Figs. 1 and 6.

The hot air from the tile-lining passages is led into the combustion-chamber of the boiler through openings $v$, situated a little above the main air-distributer $n$, and to the sides of the casing through holes 12. (See Fig. 1.)

The casings are provided with the necessary soot-cleaning and access doors $i$ $i$ and $l l$ (see Figs. 1 and 2) and an opening $z$, through which the outside end of the lower water-drum may project.

Air circulation between the plates $b$ and the fire-brick wall may be arranged at the front of the boiler only, or it may be extended to the sides and back walls of the boiler. The air may be supplied by forced, induced, or natural draft. It is desirable to insert asbestos between the fire-brick wall and the plate $b$ to prevent actual contact between the heated fire-brick and the metal wall.

When two boilers are set together in battery, as shown in Figs. 1 to 4, I form the division-wall which separates the furnaces of thin flanged plates $x$ and $y$, with an air-space between them. The flanges of these plates are bent in opposite directions and are attached to the columns $h$, which support the boiler. (See Figs. 4 and 9.) A fire-resisting lining is secured to each side of the hollow wall by means of bolts passing through the linings and hollow wall. The latter is thus common to both boilers. A circulation of air may be produced through the hollow wall by providing air-inlets at the tops or ends of the wall and discharge-ports opening into the combustion-chambers of both boilers near the bottoms of the linings and wall.

By this system of air-cooled casings hereinbefore described I am able to utilize much of the heat of combustion which has hitherto been lost in overheating the casings and brickwork and by radiation. The boiler is, in fact, practically surrounded by a non-conducting jacket of circulating air, which continually conveys the heat imparted to it by the hot gases back into the furnace. The boiler-casings are thus kept cool and the loss of heat above referred to is reduced to a minimum.

Instead of employing a fire-resisting tile lining consisting of only one layer of tile bricks with grooves or checks to form air-passages with the wall $b$ I may employ a double lining, as shown in Fig. 11. This lining consists of a lining of asbestos millboard 13 and a fire-brick wall, which is secured against the metal wall $b$ of the casing at a suitable distance by projecting pieces on the bricks, as before described. An air-passage is thus formed between the linings. The metal wall $b$ is therefore maintained at a lower temperature than when a single lining is employed. Instead of stamping the inner panel-plates $b$ with the deep flanges $e$ (shown in No. 741,630. PATENTED OCT. 20, 1903.
H. W. CROFT.
BRICK DRYING FLOOR.
APPLICATION FILED AUG. 8, 1902.
NO MODEL.
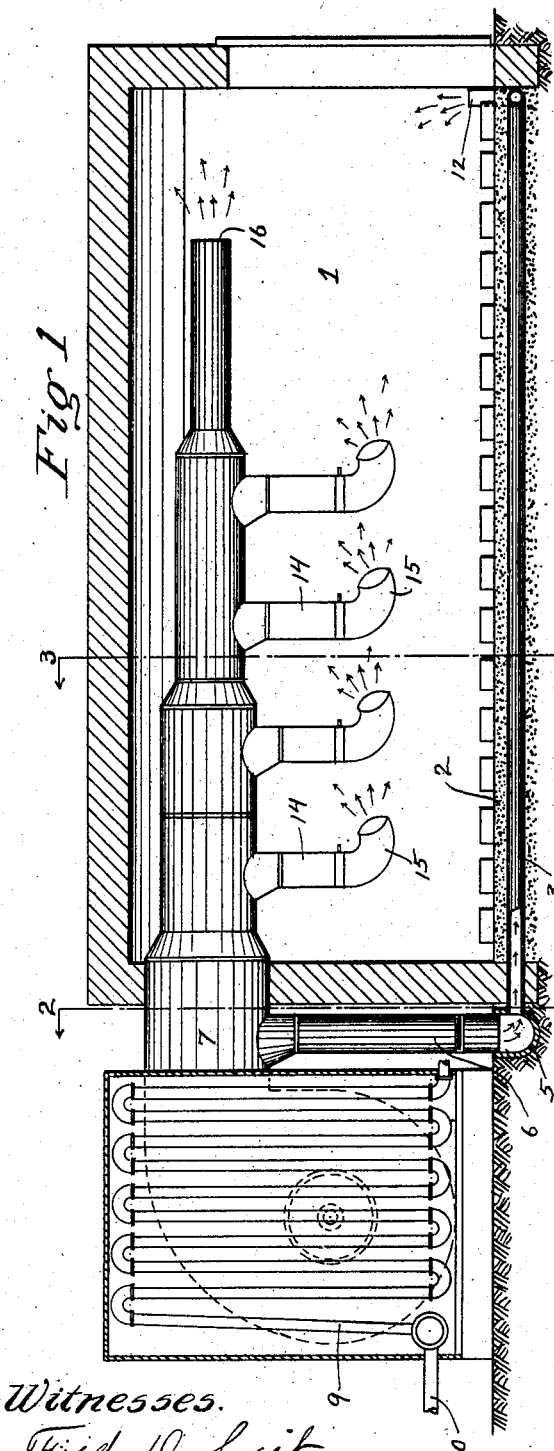
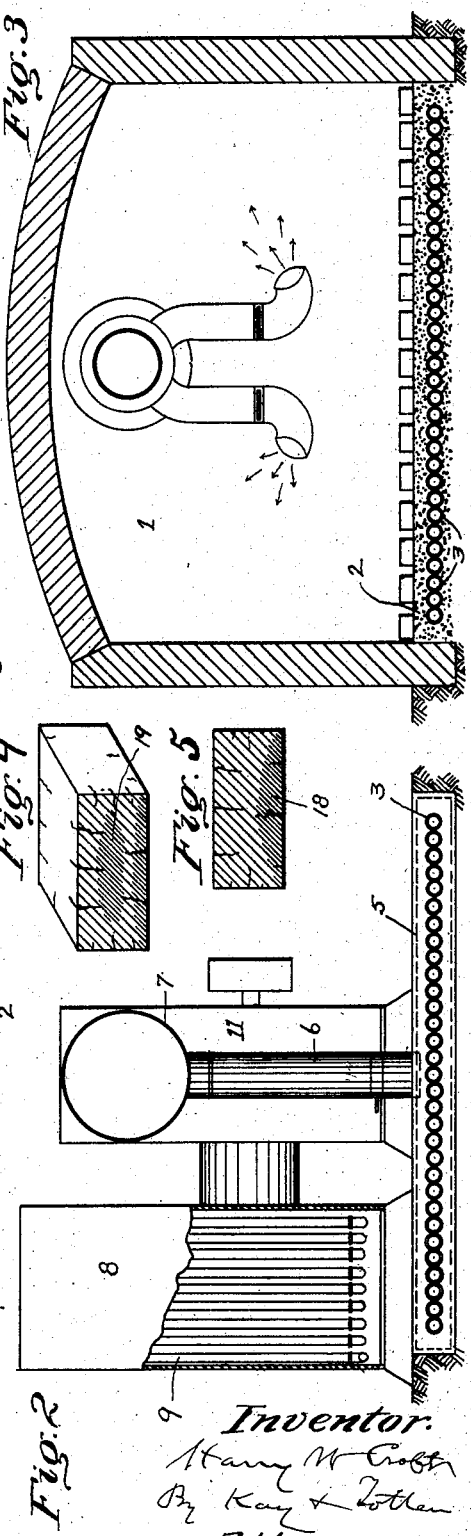
Witnesses.
Field D. Sweit.
Robert C. Totten.
Inventor.
Harry W. Croft
By Kay & Totten
Attorneys.